(12) United States Patent
Yokotsuji et al.

(10) Patent No.: US 9,478,828 B2
(45) Date of Patent: Oct. 25, 2016

(54) ELECTROLYTE FOR RECHARGEABLE LITHIUM BATTERY AND RECHARGEABLE LITHIUM BATTERY INCLUDING THE SAME

(71) Applicant: Samsung SDI Co., Ltd., Yongin-si, Gyeonggi-Do (KR)

(72) Inventors: Hokuto Yokotsuji, Yokohama (JP); Hironari Takase, Yokohama (JP)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 60 days.

(21) Appl. No.: 14/083,256

(22) Filed: Nov. 18, 2013

(65) Prior Publication Data

US 2014/0154591 A1 Jun. 5, 2014

(30) Foreign Application Priority Data

Dec. 4, 2012 (JP) ................................. 2012-265727
Jul. 19, 2013 (KR) ........................ 10-2013-0085656

(51) Int. Cl.

| H01M 10/05 | (2010.01) |
|---|---|
| H01M 10/0569 | (2010.01) |
| H01M 10/0567 | (2010.01) |
| H01M 4/38 | (2006.01) |
| H01M 10/0525 | (2010.01) |
| H01M 10/0568 | (2010.01) |
| H01M 4/505 | (2010.01) |
| H01M 4/525 | (2010.01) |

(52) U.S. Cl.
CPC ......... *H01M 10/0569* (2013.01); *H01M 4/386* (2013.01); *H01M 10/0525* (2013.01); *H01M 10/0567* (2013.01); *H01M 10/0568* (2013.01); *H01M 4/505* (2013.01); *H01M 4/525* (2013.01); *H01M 2300/0034* (2013.01); *Y02E 60/122* (2013.01)

(58) Field of Classification Search
None
See application file for complete search history.

(56) References Cited

U.S. PATENT DOCUMENTS

| 2003/0138696 A1* | 7/2003 | Peres .................... C01G 23/005 429/231.1 |
|---|---|---|
| 2008/0057400 A1* | 3/2008 | Nanno ........................ C08J 5/18 429/254 |
| 2008/0160419 A1 | 7/2008 | Segawa et al. |
| 2009/0081557 A1* | 3/2009 | Chen ..................... H01M 4/382 429/337 |
| 2009/0325076 A1 | 12/2009 | Matsui et al. |
| 2010/0047691 A1* | 2/2010 | Kawakami ............ H01M 4/366 429/221 |
| 2010/0124708 A1* | 5/2010 | Matsui et al. ................ 429/332 |
| 2011/0008681 A1* | 1/2011 | Koh et al. ..................... 429/331 |

(Continued)

FOREIGN PATENT DOCUMENTS

| EP | 2 469 633 A1 | 6/2012 |
|---|---|---|
| JP | 2008-077915 (A) | 4/2008 |

(Continued)

OTHER PUBLICATIONS

"A review on electrolyte additives for lithium ion batteries" by Zhang in Journal of Power Sources, vol. 162, pp. 1379-1394, published Oct. 2006.*

(Continued)

*Primary Examiner* — Patrick Ryan
*Assistant Examiner* — Wyatt McConnell
(74) *Attorney, Agent, or Firm* — Knobbe Martens Olson & Bear, LLP

(57) ABSTRACT

In an aspect, an electrolyte that includes a lithium salt, an organic solvent, and an additive is disclosed.

9 Claims, 1 Drawing Sheet

(56) References Cited

U.S. PATENT DOCUMENTS

2012/0121974 A1   5/2012   Tikhonov et al.
2012/0141869 A1   6/2012   Takahata

FOREIGN PATENT DOCUMENTS

| JP | 2008-288049 A   | 11/2008 |
|----|-----------------|---------|
| JP | 2009-123526 A   | 6/2009  |
| JP | 2009-187880 (A) | 8/2009  |
| JP | 2010-010095 (A) | 1/2010  |
| JP | 2010-123287 (A) | 6/2010  |
| JP | 2010-527101 (A) | 8/2010  |
| JP | 2011-082033 A   | 4/2011  |
| JP | 2012-043627 A   | 3/2012  |
| JP | 2013-037905 A   | 2/2013  |
| KR | 10-2003-0063495 A | 7/2003 |
| KR | 10-2012-0061917 A | 6/2012 |
| WO | WO 2006/115023 A1 | 11/2006 |

OTHER PUBLICATIONS

Extended European Search Report dated Feb. 25, 2014 for European Patent Application No. EP 13 195 585.8 which shares priority of Japanese Patent Application No. JP 2012-265727, filed Dec. 4, 2012, and Korean Patent Application No. KR 10-2013-0085656, filed Jul. 19, 2013, with captioned U.S. Appl. No. 14/083,256.

Japanese Office Action dated Aug. 9, 2016 for Japanese Patent Application No. JP 2012-265727.

* cited by examiner

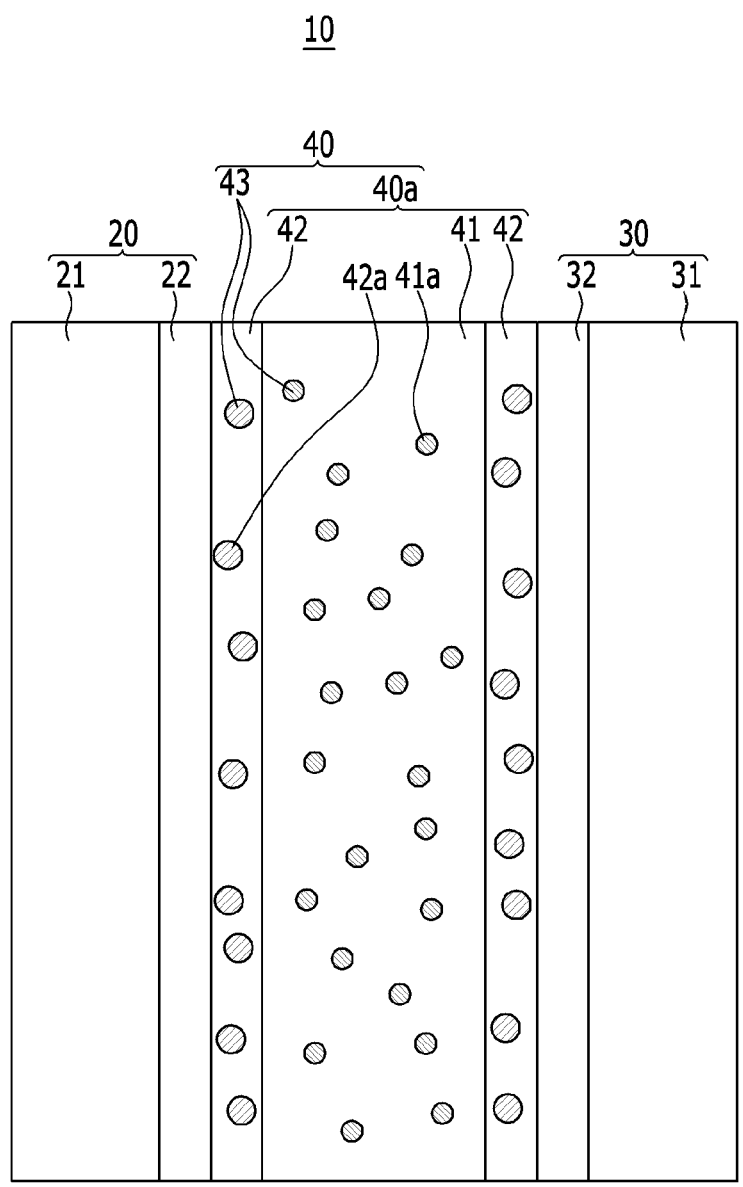

ELECTROLYTE FOR RECHARGEABLE LITHIUM BATTERY AND RECHARGEABLE LITHIUM BATTERY INCLUDING THE SAME

INCORPORATION BY REFERENCE TO ANY PRIORITY APPLICATIONS

Any and all priority claims identified in the Application Data Sheet, or any correction thereto, are hereby incorporated by reference under 37 CFR 1.57. For example, this application claims priority to and the benefit of Japanese Patent Application No. 2012-265727 filed with the Japanese Patent Office on Dec. 4, 2012, and Korean Patent Application No. 10-2013-0085656 filed with the Korean Intellectual Property Office on Jul. 19, 2013, respectively, each disclosure of which is incorporated herein by reference in its entirety.

BACKGROUND

1. Field

This disclosure relates to an electrolyte for a rechargeable lithium battery and a rechargeable lithium battery including the same.

2. Description of the Related Technology

A rechargeable lithium battery has higher energy density than a lead battery or a nickel cadmium battery. However, rechargeable lithium batteries have unsatisfactory cycle-life. Japanese Patent Laid-Open Publication No. 2009-123526 discloses an electrolyte prepared by dissolving lithium ions, anions consisting of an oxalate compound, and bis(fluorosulfonyl)imide anions in an electrolyte to improve cycle-life characteristics of a rechargeable lithium battery, but cycle-life of the disclosed rechargeable lithium battery is still unsatisfactory.

SUMMARY

Some embodiments provide an electrolyte for a rechargeable lithium battery that improves cycle-life characteristics of a rechargeable lithium battery.

Some embodiments provide a rechargeable lithium battery including the electrolyte for a rechargeable lithium battery.

Some embodiments provide an electrolyte for a rechargeable lithium battery that includes a lithium salt, an organic solvent, and an additive, wherein the organic solvent includes a fluorinated ether, and the additive includes a first lithium compound including a bissulfonyl imide anion and a lithium ion and a second lithium compound including a complex anion including a dicarboxylate anion coordinated on a center atom, and a lithium ion.

In some embodiments, the bissulfonyl imide anion may be represented by the following Chemical Formula 1.

[Chemical Formula 1]

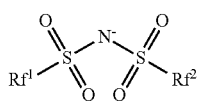

wherein, in Chemical Formula 1, $Rf^1$ and $Rf^2$ are each independently fluorine or a C1 to C4 fluoroalkyl group, or $Rf^1$ and $Rf^2$ are linked to each other to form a ring having a C1 to C4 fluoroalkylene group.

In some embodiments, the bissulfonyl imide anion may be represented by one of the following Chemical Formulas 2 to 8.

[Chemical Formula 2]

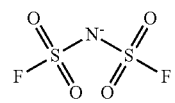

[Chemical Formula 3]

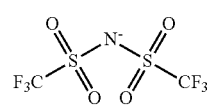

[Chemical Formula 4]

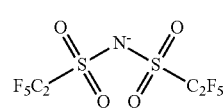

[Chemical Formula 5]

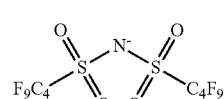

[Chemical Formula 6]

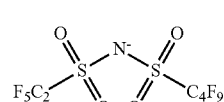

[Chemical Formula 7]

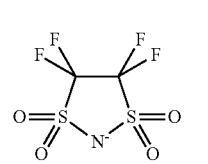

[Chemical Formula 8]

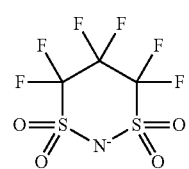

In some embodiments, the dicarboxylate anion may be an oxalic acid anion or a malonic acid anion, and the center atom may be a boron atom or a phosphorus atom.

In some embodiments, the second lithium compound may be represented by Chemical Formula 9:

[Chemical Formula 9]

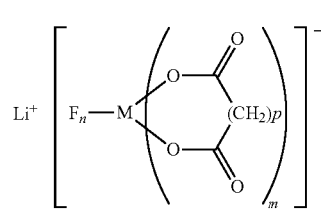

wherein, in Chemical Formula 9,

M is a boron atom or a phosphorus atom, m is an integer ranging from 1 to 3, n is an integer ranging from 0 to 4, and p is 0 or 1, when M is a boron atom, 2m+n=4, and M is phosphorus atom, 2m+n=6.

In some embodiments, the complex anion may be represented by one of Chemical Formulas 10 to 13.

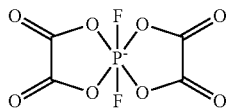
[Chemical Formula 10]

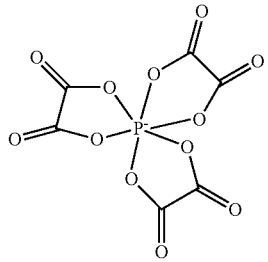
[Chemical Formula 11]

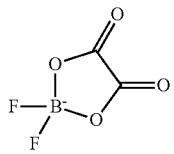
[Chemical Formula 12]

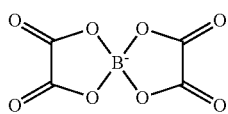
[Chemical Formula 13]

In some embodiments, the first lithium compound may be included in an amount of about 0.2 parts by weight to about 5.0 parts by weight based on the total amount, 100 parts by weight of the lithium salt and the organic solvent.

In some embodiments, the second lithium compound may be included in an amount of about 0.2 parts by weight to about 2.0 parts by weight based on the total amount, 100 parts by weight of the lithium salt and the organic solvent.

In some embodiments, the fluorinated ether may include 2,2,2-trifluoroethylmethylether, 2,2,2-trifluoroethyldifluoromethylether, 2,2,3,3,3-pentafluoropropylmethylether, 2,2,3,3,3-pentafluoropropyldifluoromethylether, 2,2,3,3,3-pentafluoropropyl-1,1,2,2-tetrafluoroethylether, 1,1,2,2-tetrafluoro ethylmethylether, 1,1,2,2-tetrafluoroethylethylether, 1,1,2,2-tetrafluoroethylpropylether, 1,1,2,2-tetrafluoroethylbutylether, 1,1,2,2-tetrafluoroethylisobutylether, 1,1,2,2-tetrafluoro ethylisopentylether, 1,1,2,2-tetrafluoroethyl-2,2,2-trifluoro ethylether, 1,1,2,2-tetrafluoroethyl-2,2,3,3-tetrafluoro propylether, hexafluoroisopropylmethylether, 1,1,3,3,3-penta fluoro-2-trifluoromethylpropylmethylether, 1,1,2,3,3,3-hexafluoro propylmethylether, 1,1,2,3,3,3-hexafluoropropylethylether, 2,2,3,4,4,4-hexafluorobutyldifluoromethylether, or a combination thereof.

In some embodiments, the fluorinated ether may be included in an amount of about 30 volume % to about 60 volume % based on the total amount of the organic solvent.

In some embodiments, the organic solvent may further include fluoroethylene carbonate, linear carbonate, cyclic carbonate, or a combination thereof, and the fluoroethylene carbonate and the cyclic carbonate may be different from each other.

When the organic solvent includes fluoroethylene carbonate, the fluoroethylene carbonate may be included in an amount of about 10 volume % to about 30 volume % based on the total amount of the organic solvent.

In some embodiments, the lithium salt may include $LiPF_6$, $LiClO_4$, $LiBF_4$, $LiAsF_6$, $LiSbF_6$, $LiSO_3CF_3$, $LiN(SO_2CF_3)$, $LiN(SO_2CF_2CF_3)$, $LiC(SO_2CF_2CF_3)_3$, $LiC(SO_2CF_3)_3$, $LiI$, $LiCl$, $LiF$, $LiPF_5(OSO_2CF_3)$, $LiPF_4(OSO_2CF_3)_2$, $LiPF_3(C_nF_{2n+1})_3$ (n is an integer of 1 to 3), $LiBF_3(C_nF_{2n+1})_3$ (n is an integer of 1 to 2), or a combination thereof.

Some embodiments provide a rechargeable lithium battery that includes a positive electrode including a positive active material; a negative electrode including a negative active material; and an electrolyte as disclosed and described herein.

In some embodiments, the positive active material may include one of compounds represented by Chemical Formulas 14 to 16.

$$Li_aMn_xCo_yNi_zO_2 \quad \text{[Chemical Formula 14]}$$

wherein, in Chemical Formula 14, 1.150≤a≤1.430, 0.45≤x≤0.6, 0.01≤y≤0.15 and 0.10≤z≤0.39.

$$LiMn_xCo_yNi_zO_2 \quad \text{[Chemical Formula 15]}$$

wherein, in Chemical Formula 15, 0.3≤x≤0.85, 0.10≤y≤0.3 and 0.10≤z≤0.3.

$$LiMn_{1.5}Ni_{0.5}O_4 \quad \text{[Chemical Formula 16]}$$

In some embodiments, the negative active material may be a silicon-based material.

Additional embodiments are provided in the following detailed description.

In some embodiments, the cycle-life characteristics, specifically cycle-life characteristics under high current density and high voltage of a rechargeable lithium battery may be improved.

BRIEF DESCRIPTION OF THE DRAWINGS

FIG. 1 is a cross-sectional view showing a structure of a rechargeable lithium battery according to one embodiment.

DETAILED DESCRIPTION

Hereinafter, embodiments are described in detail. However, these embodiments are exemplary, and this disclosure is not limited thereto.

In some embodiments, an electrolyte for a rechargeable lithium battery may include a lithium salt, an organic solvent, and an additive.

In some embodiments, the lithium salt may be an active component of the electrolyte.

In some embodiments, the lithium salt may include $LiPF_6$, $LiClO_4$, $LiBF_4$, $LiAsF_6$, $LiSbF_6$, $LiSO_3CF_3$, $LiN(SO_2CF_3)$, $LiN(SO_2CF_2CF_3)$, $LiC(SO_2CF_2CF_3)_3$, $LiC(SO_2CF_3)_3$, $LiI$, $LiCl$, $LiF$, $LiPF_5(OSO_2CF_3)$, $LiPF_4(OSO_2CF_3)_2$, $LiPF_3(C_nF_{2n+1})_3$ (n is an integer of 1 to 3), $LiBF_3(C_nF_{2n+1})_3$ (n is an integer of 1 to 2), or a combination thereof. In some embodiments, the lithium salt may include $LiPF_6$, $LiClO_4$, $LiBF_4$, $LiAsF_6$, or $LiSbF_6$ or a combination thereof. In some embodiments, the lithium salt may be dissolved singularly or as a mixture of two or more.

When the lithium salt is dissolved in the electrolyte, cycle-life characteristics of a rechargeable lithium battery may be improved.

In some embodiments, a concentration of the lithium salt (a sum of a lithium salt when a plurality of a lithium salt is dissolved in the electrolyte) may be about 1.15 mol/L to about 1.5 mol/L, and specifically about 1.3 mol/L to about 1.45 mol/L. When the concentration of the lithium salt is within the range, cycle-life characteristics of a rechargeable lithium battery may be improved.

In some embodiments, the organic solvent may include fluorinated ether.

In some embodiments, the fluorinated ether is ether where at least one hydrogen is substituted with fluorine and has improved oxidation resistance.

Examples of the fluorinated ether may include 2,2,2-trifluoroethylmethylether, 2,2,2-trifluoroethyldifluoromethylether, 2,2,3,3,3-pentafluoropropylmethylether, 2,2,3,3,3-pentafluoropropyldifluoromethylether, 2,2,3,3,3-pentafluoropropyl-1,1,2,2-tetrafluoroethylether, 1,1,2,2-tetrafluoro ethylmethylether, 1,1,2,2-tetrafluoroethylethylether, 1,1,2,2-tetrafluoroethylpropylether, 1,1,2,2-tetrafluoroethylbutylether, 1,1,2,2-tetrafluoroethylisobutylether, 1,1,2,2-tetrafluoro ethylisopentylether, 1,1,2,2-tetrafluoroethyl-2,2,2-trifluoro ethylether, 1,1,2,2-tetrafluoroethyl-2,2,3,3-tetrafluoro propylether, hexafluoroisopropylmethylether, 1,1,3,3,3-penta fluoro-2-trifluoromethylpropylmethylether, 1,1,2,3,3,3-hexafluoropropylmethylether, 1,1,2,3,3,3-hexafluoropropyl-ethylether, 2,2,3,4,4,4-hexafluorobutyldifluoromethylether, and the like, considering resistance against a charge voltage and a current density. These may be used singularly or as a mixture of two or more.

In some embodiments, the fluorinated ether may be included in an amount of about 30 volume % to a 60 volume %, and specifically 35 volume % to 50 volume % based on the total amount of the organic solvent. When the fluorinated ether is included within the range, cycle-life characteristics may further improved.

In some embodiments, the organic solvent may further include fluoroethylene carbonate, linear carbonate, cyclic carbonate, or a combination thereof.

In some embodiments, the fluoroethylene carbonate may be included in an amount of about 10 volume % to about 30 volume % and specifically about 15 volume % to about 20 volume % based on the total amount of the organic solvent when the organic solvent further includes fluoroethylene carbonate. When the fluoroethylene carbonate is included within the range, cycle-life characteristics may be further improved.

In some embodiments, the linear carbonate may include dimethyl carbonate, diethyl carbonate, dipropyl carbonate, methylpropyl carbonate, ethylpropyl carbonate, methylethyl carbonate, ethylmethyl carbonate, or a combination thereof, but is not limited thereto.

In some embodiments, the cyclic carbonate may include ethylene carbonate, propylene carbonate, butylene carbonate, or a combination thereof, but is not limited thereto.

In some embodiments, the additive may include a first lithium compound and a second lithium compound.

In some embodiments, the first lithium compound may be a compound including a bissulfonyl imide anion and a lithium ion, and the second lithium compound may be a compound including a complex anion including a dicarboxylate anion coordinated on a center atom, and a lithium ion.

In some embodiments, the bissulfonyl imide anion of the first lithium compound may be represented by Chemical Formula 1.

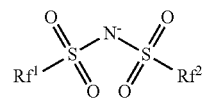

[Chemical Formula 1]

wherein, in Chemical Formula 1, $Rf^1$ and $Rf^2$ are each independently fluorine or a C1 to C4 fluoroalkyl group, or $Rf^1$ and $Rf^2$ are linked to each other to form a ring having a C1 to C4 fluoroalkylene group.

In some embodiments, the bissulfonyl imide anion may be represented by one of Chemical Formulae 2 to 8.

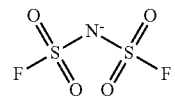

[Chemical Formula 2]

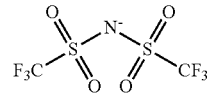

[Chemical Formula 3]

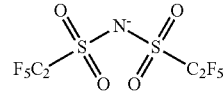

[Chemical Formula 4]

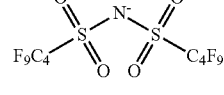

[Chemical Formula 5]

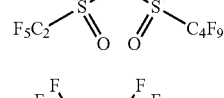

[Chemical Formula 6]

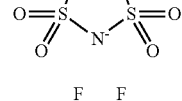

[Chemical Formula 7]

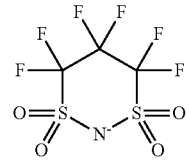

[Chemical Formula 8]

In some embodiments, the first lithium compound may be included in an amount of about 0.2 parts by weight to about 5.0 parts, specifically about 0.2 parts by weight to about 2.0 parts by weight by weight based on the total amount, 100 parts by weight of the lithium salt and the organic solvent. When the first lithium compound is included within the range, cycle-life characteristics may be further improved.

In some embodiments, the second lithium compound may include a complex anion including a dicarboxylate anion coordinated on a center atom.

In some embodiments, the dicarboxylate anion may be an oxalic acid anion or a malonic acid anion. In some embodiments, the center atom may be a boron atom or a phosphorus atom.

In some embodiments, the second lithium compound may be represented by Chemical Formula 9.

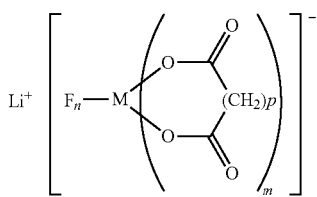

[Chemical Formula 9]

wherein, in Chemical Formula 9,

M is a boron atom or a phosphorus atom, m is an integer ranging from 1 to 3, n is an integer ranging from 0 to 4, and p is 0 or 1, when M is a boron atom, 2m+n=4, and M is phosphorus atom, 2m+n=6.

In some embodiments, the complex anion may be represented by one of Chemical Formulae 10 to 13.

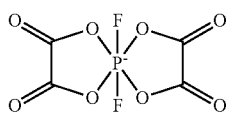

[Chemical Formula 10]

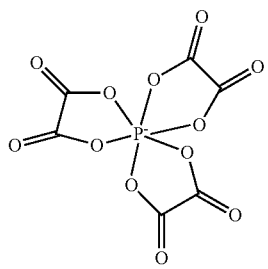

[Chemical Formula 11]

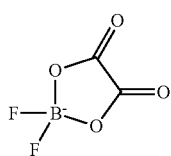

[Chemical Formula 12]

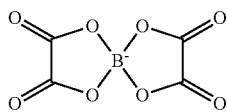

[Chemical Formula 13]

In some embodiments, the second lithium compound may be included in an amount of about 0.2 parts by weight to about 2.0 parts by weight, specifically about 0.2 parts by weight to about 1.0 parts by weight based on the total amount, 100 parts by weight of the lithium salt and the organic solvent. When the second lithium compound is included within the range, cycle-life characteristics may be further improved.

In some embodiments, the additive may further include a SEI (solid electrolyte interface) forming agent of a negative electrode, a surfactant, and the like.

Examples of such an additive may include vinylene carbonate, vinylethylene carbonate, phenylethylene carbonate, succinic anhydride, lithium bisoxalate, tetrafluoroboric acid lithium, dinitrile compound, propane sultone, butane sultone, propene sultone, 3-sulforene, fluorinated allyl ether, fluorinated acrylate, and the like.

In some embodiments, the dinitrile compound may be succinonitrile, adiponitrile, and the like.

In some embodiments, the fluorinated allyl ether may be (2H-perfluoroethyl)-2-propenyl ether, allyl-2,2,3,3,4,4,5,5-octafluoropentyl ether, heptafluoro-2-propylallyl ether, and the like.

In some embodiments, the fluorinated acrylate may be 1H,1H-pentafluoropropyl acrylate, 2,2,3,3-tetrafluoropropyl acrylate, and the like.

In some embodiments, the additive such as the SEI forming agent of the negative electrode, the surfactant, and the like may be included in an amount of about 0.01 parts by weight to about 5.0 parts by weight, and specifically about 0.02 parts by weight to about 3.0 parts by weight based on the total amount, 100 parts by weight of the lithium salt and the organic solvent. When the additive is include within the range, cycle-life characteristics may further improved.

Hereinafter, a rechargeable lithium battery including the electrolyte is described referring to FIG. 1.

FIG. 1 is a cross-sectional view showing a structure of a rechargeable lithium battery according to one embodiment.

Referring to FIG. 1, a rechargeable lithium battery 10 includes a positive electrode 20, a negative electrode 30, and a separator layer 40 interposed between the positive electrode 20 and the negative electrode 30.

In some embodiments, a charge cut-off voltage (oxidation reduction potential) (vs. Li/Li+) of the rechargeable lithium battery may be for example, greater than or equal to about 4.3V and less than or equal to about 5.0V, and specifically greater than or equal to about 4.5V and less than or equal to about 5.0V.

The rechargeable lithium battery has no particular limit about its shape, and for example, may have a shape such as a cylinder, a prism, a laminated type, a button-type, and the like.

In some embodiments, the positive electrode 20 includes a current collector 21 and a positive active material layer 22 formed on the current collector 21.

The current collector may be any conductor, and may be, for example, aluminum, stainless steel, nickel-plated steel, and the like.

In some embodiments, the positive active material layer includes a positive active material and additionally, a conductive material and a binder.

In some embodiments, the positive active material may include a lithium oxide-based solid solution but has no particular limit, as far as a material electrochemically intercalates or deintercalates lithium ions.

In some embodiments, the lithium oxide-based solid solution may be one of compounds represented by Chemical Formulas 14 to 16. In some embodiments, lithium oxide-based solid solution may be the compound represented by Chemical Formula 14. When the lithium oxide-based solid solution is used as a positive active material, elution of a transition metal may be suppressed and thus storage characteristics at a high temperature may be improved, and cycle-life characteristics under a high current density and high voltage may be improved.

   [Chemical Formula 14]

wherein, in Chemical Formula 14, $1.150 \leq a \leq 1.430$, $0.45 \leq x \leq 0.6$, $0.01 \leq y \leq 0.15$ and $0.10 \leq z \leq 0.39$.

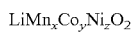   [Chemical Formula 15]

wherein, in Chemical Formula 15, $0.3 \leq x \leq 0.85$, $0.10 \leq y \leq 0.3$ and $0.10 \leq z \leq 0.3$.

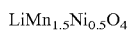   [Chemical Formula 16]

A content of the positive active material is not particularly limited.

The conductive material may include, for example, carbon black such as ketjen black, acetylene black, and the like, natural graphite, artificial graphite, and the like but has no particular limit, as far as any material increases conductivity of a positive electrode.

A content of the conductive material is not particularly limited, and may be used in an amount used in a positive active material layer of a rechargeable lithium battery.

The binder may include, for example, polyvinylidene fluoride, an ethylene-propylene-diene terpolymer, a styrene-butadiene rubber, acrylonitrile-butadiene rubber, a fluoro rubber, polyvinyl acetate, polymethylmethacrylate, polyethylene, nitrocellulose, and the like, but has no particular limit as far as any material binds the positive active material and the conductive material on the current collector.

In some embodiments, the binder may be included in a range of about 3 wt % to about 7 wt %, and specifically about 4 wt % to about 6 wt % based on total amount of the positive active material layer. When the binder is included within the range, a cycle-life is excellent, and energy density is improved.

A density of the positive active material layer is not particularly limited, but may be, for example about 2.0 g/cm$^3$ to about 3.0 g/cm$^3$, and specifically about 2.5 g/cm$^3$ to about 3.0 g/cm$^3$. When the density of the positive active material layer is within the range, positive active material particles are not destroyed, and thus damage on electrical contact among the particles does not occur, and cycle-life characteristics and energy density may be improved due to an increased utilization rate of a positive active material.

The density of the positive active material layer may be obtained by dividing the surface density of the positive active material layer after the compression by the thickness of the positive active material layer after the compression.

The positive active material layer may be formed by, for example, dispersing the positive active material, the conductive material, and the binder in an organic solvent such as N-methyl-2-pyrrolidone, and the like to form a slurry, and coating the slurry on the current collector followed by drying and compressing the same.

The coating method has no particular limit but may include, for example, a knife coating, a gravure coating, and the like.

In some embodiments, the negative electrode 30 includes a current collector 31 and a negative active material layer 32 formed on the current collector 31.

In some embodiments, the current collector 31 may be any conductor, for example, aluminum, stainless steel, nickel-plated steel, and the like.

In some embodiments, the negative active material layer may be any negative active material layer used in a rechargeable lithium battery. Specifically, the negative active material layer includes a negative active material, and additionally a conductive material and a binder.

In some embodiments, the negative active material may be no particular limit and may be any material that electrochemically intercalates or deintercalates lithium ions. For example, the negative active material may include, for example, a graphite active material such as artificial graphite, natural graphite, and a mixture of artificial graphite and natural graphite, natural graphite coated with artificial graphite, and the like; a titanium oxide-based compound such as silicon or tin, a mixture of silicon or tin particulates and the graphite active material, silicon particulate or tin particulate, a silicon-containing alloy or tin-containing alloy, $Li_4Ti_5O_{12}$, and the like; and the like. Among them, the silicon-based material may be preferably used.

When the silicon-based material is used as a negative active material, cycle-life characteristics under a high current density and high voltage may be further improved.

In some embodiments, the silicon-based material may be specifically, Si, $SiO_x$ (0<x<2), a Si—C composite, a Si-Q alloy (wherein Q is an alkali metal, an alkaline-earth metal, Group 13 to 16 elements, a transition metal, a rare earth element, or a combination thereof, but not Si), or a combination thereof. Among them, the $SiO_x$ (0<x<2) may be preferably used.

In some embodiments, a content of the negative active material may be included in an amount of about 90 wt % to about 98 wt % based on the total amount of the negative active material layer. When the content of the negative active material is within the range, cycle-life characteristics and energy density may be improved.

In some embodiments, the conductive material may be the same as the conductive material of the positive active material layer.

In some embodiments, the binder may be the same as the binder of the positive active material layer.

In some embodiments, the positive active material layer may be coated on the current collector with carboxylmethyl cellulose as a thickener. In some embodiments, the binder and the thickener may be used in a weight ratio of about 1:1 to about 10:1.

In some embodiments, the total content of the binder and the thickener may be about 1 wt % to about 10 wt % based on the total amount of the negative active material layer. When the total content of the binder and the thickener is within the above range, cycle-life characteristics and energy density may be improved.

In some embodiments, a density of the negative active material layer has no particular limit, but may be, for example, about 1.0 g/cm$^3$ to about 2.0 g/cm$^3$. When the density of the negative active material layer is within the range, cycle-life characteristics and energy density may be improved.

The negative active material layer may be formed, for example, by dispersing the negative active material and the binder in a solvent such as N-methyl-2-pyrrolidone, water, and the like to prepare a slurry, and coating the slurry on the current collector, followed by drying the same.

The density of the negative active material layer may be obtained by dividing the surface density of the negative active material layer after the compression by the thickness of the negative active material layer after the compression.

In some embodiments, the separator layer 40 may include a separator 40a and an electrolyte 43.

In some embodiments, the separator 40a may include a substrate 41 and a porous layer 42 positioned on at least one side of the substrate 41.

In some embodiments, the substrate 41 may be composed of a material of polyethylene, polypropylene, and the like, and may include a plurality of the first pore 41a.

In FIG. 1, even though the first pore 41a has a spherical shape, but may have various shapes without limitation.

In some embodiments, the first pore may have a diameter of, for example, about 0.1 μm to about 0.5 μm. In some embodiments, the diameter of the first pore may indicate a diameter when the first pore is considered to be a spherical shape.

The first pore may be measured by, for example, an auto porosimeter (AutoporeIV) (SHIMADZU Corporation, Kyoto, Japan). The measuring device is used, for example, to measure distribution of a diameter distribution of the first pore, and calculate a representative value of the diameter having the highest distribution.

In some embodiments, the diameter of the first pore 41a present in the surface layer of the substrate 41 may be measured using a scanning electron microscope (JSM-6060, JEOL Ltd., Tokyo, Japan). In some embodiments, the measuring device may measure each diameter of the first pore, for example, the surface layer.

In some embodiments, the substrate 41 may have a porosity of about 38 volume % to about 44 volume %. When the porosity of the substrate is within the range, cycle-life characteristics may be improved. In some embodiments, the porosity of the substrate may be obtained by dividing the total volume of the first pore by the total volume of the substrate. In some embodiments, the porosity of the substrate may be measured using an auto porosimeter (AutoporeIV) (SHIMADZU Corporation).

In some embodiments, the substrate 41 may have a thickness ranging from about 6 µm to about 19 µm. When the substrate 41 has a thickness within the range, a cycle-life is improved.

In some embodiments, the porous layer 42 may be formed of a material different from the substrate 41, for example, a resin such as polyvinylidene fluoride, polyamideimide, aramid (aromatic polyamide), and the like and includes a plurality of the second pores 42a.

In some embodiments, the second pores 42a may have a spherical shape as shown in FIG. 1 but various other shapes.

In some embodiments, the second pore 42a may be different from the first pore 41a.

In some embodiments, the diameter and porosity of the second pore 42a may be larger than the first pore 41a. In some embodiments, the second pore 42a may have a diameter of about 1 µm to about 2 µm.

The diameter of the second pore 42a is a diameter when the second pore 42a is considered to have a spherical shape.

In some embodiments, the diameter of the second pores 42a may be measured using, for example a scanning electron microscope JSM-6060 (JEOL Ltd.).

Examples of polyvinylidene fluoride used in the porous layer 42 may be KF polymer #1700, #9200, #9300, and the like made by KUREHA Co. Tokyo, Japan.

In some embodiments, the polyvinylidene fluoride may have a weight average molecular weight ranging from about 500,000 to about 1,000,000.

In some embodiments, the separator 40a may have porosity ranging from about 39% to about 58%. When the separator 40a has porosity within the range, a cycle-life is improved.

In some embodiments, the porosity of the separator 40a may be obtained by dividing the volume sum of the first pores 41a and the second pores 42a by the total volume of the separator 40a, that is, the volume sum of the resin and the first pores 41a of the substrate 41 and the resin and the second pores 42a of the porous layer 42.

In some embodiments, the porosity of the separator 40a may be measured using an auto porosimeter (AutoporeIV) (SHIMADZU Corporation).

In some embodiments, the second pore 42a may have a higher porosity than the first pore 41a.

In some embodiments, a thickness of the porous layer 42 may be about 1 µm to about 5 µm. In some embodiments, the thickness of the separator 40a, that is, the thickness sum of the substrate 41 and the porous layer 42 may be in a range of about 10 µm to about 25 µm. When the porous layer 42 and the separator 40a respectively have a thickness within the range, cycle-life characteristics may be improved.

In some embodiments, the porous layer 42 may be formed on both sides of the substrate 41, that is, the side of the substrate 41 facing the positive electrode 20 and the other side thereof facing the negative electrode 30, but is not limited thereto, and may be positioned on at least one side of the negative electrode 30. In some embodiments, the porous layer 42 may be formed on both side of the substrate 41 in order to improve cycle-life characteristics of a rechargeable lithium battery.

In some embodiments, the substrate 41 may have air permeation, specifically defined as Japanese Industrial Standard P8117 (JIS P8117), ranging from about 250 sec/100 cc to about 300 sec/100 cc but is not limited thereto. In some embodiments, the separator 40a may have air permeation ranging from about 220 sec/100 cc to about 340 sec/100 cc but is not limited thereto. When the substrate 41 and the separator 40a respectively have air permeation within the range, a cycle-life will be improved.

In some embodiments, the air permeation of the substrate 41 and the separator 40a may be measured using a GURLEY air permeation meter G-B2 (Dongyang Creditech Co. Ltd., Yongin Si Gyeonggi-Do, Korea).

In some embodiments, the separator 40a may be manufactured by coating a coating solution including a resin and water-soluble organic solvent for forming the porous layer 42 on the substrate 41, solidifying the resin and removing the water-soluble organic solvent.

In some embodiments, the electrolyte 43 is the same as described above.

In some embodiments, the separator 40a may be manufactured as follow.

First, a coating solution is prepared by mixing the resin and the water-soluble organic solvent in a weight ratio ranging from about 5 to 10:about 90 to 95 for forming the porous layer 42. The water-soluble organic solvent may be, for example, N-methyl-2-pyrrolidone, dimethyl acetamide, tripropylene glycol, and the like.

Subsequently, the coating solution is coated to be about 1 µm to about 5 µm thick on both sides or one side of the substrate 41. Then, the coated substrate 41 is treated with a solidification solution to solidify the resin in the coating solution. Herein, the method of treating the coated substrate 41 with the solidification solution may be for example, a method of dipping the coated substrate 41 in the solidification solution or strongly pouring the solidification solution on the coated substrate. Accordingly, the separator 40a may be manufactured.

The solidification solution may be obtained by, for example, mixing the water-soluble organic solvent with water. In some embodiments, the water may be mixed in an amount of about 40 volume % to about 80 volume % based on the total volume of the solidification solution.

Subsequently, the separator 40a is rinsed and dried to remove water and the water-soluble organic solvent from the separator 40a.

Subsequently, the separator 40a is disposed between the positive electrode 20 and the negative electrode 30 to manufacture an electrode assembly.

In some embodiments, the negative electrode 30 may face the porous layer 42 when the porous layer 42 is formed only on one side of the substrate 41.

Subsequently, the electrode assembly is processed to have a desired shape, for example, a cylinder, a prism, a laminated type, a button-type, and the like and then, inserted into the case having the shape. Then, the above electrolyte is injected into the case, so that the pore of the separator 40a may be impregnated with the electrolyte. Accordingly, a rechargeable lithium battery is manufactured.

Hereinafter, the embodiments are illustrated in more detail with reference to examples. These examples, however, should not in any sense be interpreted as limiting the scope of the present invention.

Furthermore, what is not described in this disclosure may be sufficiently understood by those who have knowledge in this field and will not be illustrated here.

Example 1

Manufacture of Positive Electrode 90 wt % of a lithium oxide-based solid solution ($Li_{1.20}Mn_{0.55}Co_{0.10}Ni_{0.15}O_2$), 6 wt % of ketjen black, and 4 wt % of polyvinylidene fluoride were dispersed in N-methyl-2-pyrrolidone to prepare a slurry. The slurry was coated on an aluminum current collecting foil as a current collector and dried to form a positive active material layer. Subsequently, the positive active material layer was pressed, manufacturing a positive electrode. Herein, the positive active material layer was pressed to have density of 2.3 g/cm$^3$.

Manufacture of Negative Electrode 80 wt % of a silicon alloy (L-20772, 3M, St. Paul, Minn.), 12 wt % of artificial graphite, and 8 wt % of polyvinylidene fluoride were dispersed in N-methyl-2-pyrrolidone to prepare a slurry. The slurry was coated on an aluminum current-collecting foil as a current collector and dried to form a negative active material layer. Subsequently, the negative active material layer was pressed by a presser to manufacture a negative electrode. Herein, the negative active material layer was pressed to have a density of 1.45 g/cm3.

Manufacture of Separator

Aramid (poly[N,N-(1,3-phenylene)isophthalamide], Sigma-Aldrich Japan K.K., Tokyo, Japan) was mixed with a water-soluble organic solvent in a weight ratio of 5.5:94.5, preparing a coating solution. The water-soluble organic solvent was prepared by mixing dimethyl acetamide and tripropylene glycol in a weight ratio of 50:50.

A porous polyethylene film (a thickness of 13 μm, a porosity of 42 volume %) was used as a substrate.

The coating solution was coated to be 2 μm thick on both sides of the substrate. Subsequently, the substrate coated with the coating solution was dipped in a solidification solution to solidify a resin, manufacturing a separator. Herein, the solidification solution was prepared by mixing water, dimethyl acetamide, and tripropylene glycol in a weight ratio of 50:25:25.

Subsequently, the separator was rinsed and dried to remove water and the water-soluble organic solvent.

Preparation of Electrolyte

An electrolyte was prepared by mixing monofluoroethylene carbonate (FEC), dimethyl carbonate (DMC), and $HCF_2CF_2OCH_2CF_2CF_2H$, fluorinated ether, in a volume ratio of 15:45:40 to prepare an organic solvent and dissolving a lithium salt, hexafluoro phosphoric acid lithium, in a concentration of 1.2 mol/L. Then, a first lithium compound, $Li(FSO_2)_2N$, and a second lithium compound, $LiPF_2(C_2O_4)_2$ were thereto respectively in an amount of 1 part by weight based on 100 parts by weight of the total weight of the organic solvent and the lithium salt.

Manufacture of Rechargeable Lithium Battery Cell

The separator was disposed between positive and negative electrodes, manufacturing an electrode assembly. The electrode assembly was inserted in a test container, the electrolyte was injected into the test container to impregnate the electrolyte into each pore in the separator, manufacturing a rechargeable lithium battery cell.

Examples 2 to 10 and Comparative Examples 1 to 5

A rechargeable lithium battery cell was manufactured according to the same method as Example 1 by using an electrolyte having the same composition as in the following Table 1.

In the following Table 1, "-" indicates that a lithium compound was not used. In addition, the "DEC" indicates diethyl carbonate.

Evaluation 1: Cycle-Life Characteristics of Examples 1 to 10 and Comparative Examples 1 to 5

The rechargeable lithium battery cells according to Examples 1 to 10 and Comparative Examples 1 to 5 were charged at 3 mA/cm$^2$ to a voltage of 4.55V under a constant current/constant voltage and discharged to a voltage of 2.00V under a constant current, and this charge and discharge cycle was 100 times repeated. Discharge capacity of the rechargeable lithium battery cells was measured at each cycle.

The tests were all performed at 45° C.

The discharge capacity was measured by using TOSCAT3000 (Toyo System Co., Ltd., Tokyo, Japan).

The capacity retention (%) in the following Table 1 was obtained as a percentage calculated by dividing discharge capacity at the 100th cycle by discharge capacity at the first cycle as initial capacity.

TABLE 1

| | First lithium compound | Second lithium compound | Lithium salt | Organic solvent (volume ratio) | Capacity retention (%) |
|---|---|---|---|---|---|
| Example 1 | $Li(FSO_2)_2N$ | $LiPF_2(C_2O_4)_2$ | $LiPF_6$ | FEC/DMC/ $HCF_2CF_2OCH_2CF_2CF_2H$ (15/45/40) | 81.9 |
| Example 2 | | $LiP(C_2O_4)_3$ | | | 77.4 |
| Example 3 | | $LiBF_2(C_2O_4)$ | | | 80.9 |
| Example 4 | | $LiB(C_2O_4)_2$ | | | 78.5 |
| Example 5 | $Li(CF_3SO_2)_2N$ | $LiPF_2(C_2O_4)_2$ | | | 78.1 |
| Example 6 | $Li(C_2F_5SO_2)_2N$ | | | | 77.9 |
| Example 7 | $Li(C_4F_9SO_2)_2N$ | | | | 77.8 |
| Example 8 | $LiC_2F_5SO_2NSO_2C_4F_9$ | | | | 78.9 |
| Example 9 | Li—5CFSI | | | | 80.2 |
| Example 10 | Li—6CFSI | | | | 80.1 |
| Comparative Example 1 | — | — | | FEC/DMC/ $HCF_2CF_2OCH_2CF_2CF_2H$ | 52.4 |
| Comparative Example 2 | — | $LiPF_2(C_2O_4)_2$ | | (15/45/40) | 54.8 |

TABLE 1-continued

|  | First lithium compound | Second lithium compound | Lithium salt | Organic solvent (volume ratio) | Capacity retention (%) |
|---|---|---|---|---|---|
| Comparative Example 3 | — | LiBF$_2$(C$_2$O$_4$) |  |  | 53.7 |
| Comparative Example 4 | Li(FSO$_2$)$_2$N | — |  |  | 41.5 |
| Comparative Example 5 |  | LiPF$_2$(C$_2$O$_4$)$_2$ |  | FEC/DMC/DEC = 15/1/40 | 21.3 |

In Table 1, Li-5CFSI and Li-6CFSI are respectively compounds represented by the following Chemical Formulas 17 and 18.

[Chemical Formula 17]

[Chemical Formula 18]

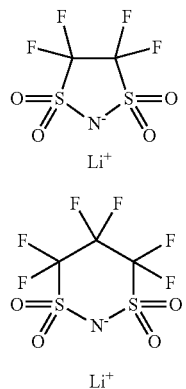

Referring to Table 1, Examples 1 to 10 including fluorinated ether, a first lithium compound, and a second lithium compound in an electrolyte showed improved cycle-life characteristics under a high current density and a high operation voltage compared with Comparative Examples 1 to 5.

Examples 11 to 17

Each rechargeable lithium battery cell was manufactured according to the same method as Example 1 except for changing the amount of Li(FSO$_2$)$_2$N as the first lithium compound and LiPF$_2$(C$_2$O$_4$)$_2$ as the second lithium compound as provided in the following Table 2.

A cycle test of the rechargeable lithium battery cells was performed in the same method as Example 1, and the capacity retention results are provided in the following Table 2.

TABLE 2

|  | Li(FSO$_2$)$_2$N (parts by weight) | LiPF$_2$(C$_2$O$_4$)$_2$ (parts by weight) | Capacity retention (%) |
|---|---|---|---|
| Example 1 | 1.0 | 1.0 | 81.9 |
| Example 11 | 0.2 |  | 78.4 |
| Example 12 | 0.5 |  | 80.1 |
| Example 13 | 2.0 |  | 81.8 |
| Example 14 | 5.0 |  | 81.4 |
| Example 15 | 1.0 | 0.2 | 77.9 |
| Example 16 |  | 0.5 | 80.4 |
| Example 17 |  | 2.0 | 80.1 |
| Comparative Example 1 | — | — | 52.4 |
| Comparative Example 2 | — | 1.0 | 54.8 |
| Comparative Example 4 | 1.0 | — | 41.5 |

In Table 2, Li(FSO$_2$)$_2$N and LiPF$_2$(C$_2$O$_4$)$_2$ were respectively added based on 100 parts by weight of the total weight of the organic solvent and the lithium salt.

Referring to Table 2, when the first lithium compound in an amount of 0.2 parts by weight to 5.0 parts by weigh and the second lithium compound in an amount of 0.2 parts by weight to 2.0 parts by weight were used, capacity retention turned out excellent.

Examples 18 to 22 and Comparative Examples 6 to 8

Each rechargeable lithium battery was manufactured according to the same method as Example 1 except for manufacturing a negative electrode by using 97.5 wt % of artificial graphite and 2.5 wt % of polyvinylidene fluoride and changing the composition of the electrolyte as provided in the following Table 3.

The cycle test as in Example 1 was performed, and the capacity retention results of the cells were provided in the following Table 3.

TABLE 3

|  | First lithium compound | Second lithium compound | Lithium salt | Organic solvent (volume ratio) | Capacity retention (%) |
|---|---|---|---|---|---|
| Example 18 | Li(FSO$_2$)$_2$N | LiPF$_2$(C$_2$O$_4$)$_2$ | LiPF$_6$ | FEC/DMC/ | 92.1 |
| Example 19 |  | LiBF$_2$(C$_2$O$_4$) |  | HCF$_2$CF$_2$OCH$_2$CF$_2$CF$_2$H | 91.6 |
| Example 20 | Li(CF$_3$SO$_2$)$_2$N | LiPF$_2$(C$_2$O$_4$)$_2$ |  | (15/45/40) | 90.9 |
| Example 21 | Li—5CFSI |  |  |  | 91.1 |
| Comparative | — | — |  | FEC/DMC/ HCF$_2$CF$_2$OCH$_2$CF$_2$CF$_2$H | 88.1 |

TABLE 3-continued

| | First lithium compound | Second lithium compound | Lithium salt | Organic solvent (volume ratio) | Capacity retention (%) |
|---|---|---|---|---|---|
| Example 6 | | | | (15/45/40) | |
| Comparative Example 7 | — | $LiPF_2(C_2O_4)_2$ | | | 87.9 |
| Comparative Example 8 | $Li(FSO_2)_2N$ | — | | | 88.0 |

Referring to Table 3, even when graphite was used as a negative active material, cycle-life characteristic was improved.

Examples 22 to 25

Each rechargeable lithium battery cell was manufactured according to the same method as Example 1 except for changing the composition of an organic solvent in the electrolyte as provided in the following Table 4.

The same cycle as in Example 1 was performed, and the capacity retention results are provided in the following Table 4.

TABLE 4

| | Organic solvent (volume ratio) | Capacity retention (%) |
|---|---|---|
| Example 1 | $FEC/DMC/HCF_2CF_2OCH_2CF_2CF_2H$ (15/45/40) | 81.9 |
| Example 22 | $FEC/DMC/HCF_2CF_2OCH_2CF_2CF_2H$ (15/65/20) | 76.8 |
| Example 23 | $FEC/DMC/HCF_2CF_2OCH_2CF_2CF_2H$ (15/55/30) | 82.1 |
| Example 24 | $FEC/DMC/HCF_2CF_2OCH_2CF_2CF_2H$ (15/35/50) | 81.5 |
| Example 25 | $FEC/DMC/HCF_2CF_2OCH_2CF_2CF_2H$ (15/25/60) | 80.2 |
| Comparative Example 5 | FEC/DMC/DEC (15/45/40) | 21.3 |

Referring to Table 4, when the amount of fluorinated ether was used within the range according to one embodiment, cycle-life characteristic was improved.

Accordingly, an electrolyte including a first lithium compound, a second lithium compound, and fluorinated ether according to one embodiment improved cycle-life characteristics under a high current density and a high voltage.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An electrolyte for a rechargeable lithium battery, comprising
a lithium salt; an organic solvent; and
an additive,
wherein the organic solvent consists of 1,1,2,2-tetrafluoroethyl-2,2,3,3-tetrafluoropropylether, monofluoroethylene carbonate and dimethyl carbonate, wherein 1,1,2,2-tetrafluoroethyl-2,2,3,3-tetrafluoropropylether is included in an amount of 30 volume % to 60 volume % based on total amount of the organic solvent and monofluoroethylene carbonate is included an amount of 10 volume % to 30 volume % based on total amount of the organic solvent, and
the additive is a first lithium compound including a bissulfonyl imide anion and a lithium ion, and a second lithium compound including a complex anion said complex anion including a dicarboxylate anion coordinated on a center atom, and a lithium ion,
wherein the first lithium compound is included in an amount of 0.2 parts by weight to 5.0 parts by weight based on 100 parts by weight of the total weight of the lithium salt and the organic solvent,
wherein the second lithium compound is included in an amount of 0.2 parts by weight to 2.0 parts by weight based on 100 parts by weight of the total weight of the lithium salt and the organic solvent,
wherein the bissulfonyl imide anion is represented by Chemical Formula 1:

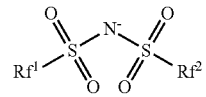

[Chemical Formula 1]

wherein,
$Rf^1$ and $Rf^2$ are each independently fluorine or a C1 to C4 fluoroalkyl group, or $Rf^1$ and $Rf^2$ are linked to each other to form a ring having a C1 to C4 fluoroalkylene group, and
wherein the second lithium compound is represented by Chemical Formula 9:

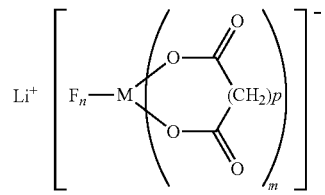

[Chemical Formula 9]

wherein,
M is a phosphorus atom,
m is 2,
n is 2, and
p is 0 or 1.

2. The electrolyte for a rechargeable lithium battery of claim 1, wherein the bissulfonyl imide anion is represented by one of the following Chemical Formulas 2 to 8:

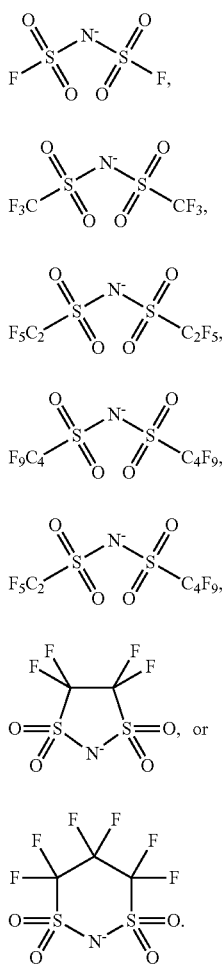

[Chemical Formula 2]

[Chemical Formula 3]

[Chemical Formula 4]

[Chemical Formula 5]

[Chemical Formula 6]

[Chemical Formula 7]

[Chemical Formula 8]

3. The electrolyte for a rechargeable lithium battery of claim 1, wherein the complex anion is represented by Chemical Formula 10:

[Chemical Formula 10]

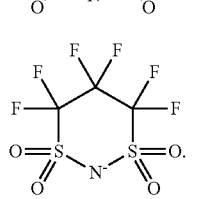

4. The electrolyte for a rechargeable lithium battery of claim 1, wherein the lithium salt comprises $LiPF_6$, $LiClO_4$, $LiBF_4$, $LiAsF_6$, $LiSbF_6$, $LiSO_3CF_3$, $LiN(SO_2CF_3)$, $LiN(SO_2CF_2CF_3)$, $LiC(SO_2CF_2CF_3)_3$, $LiC(SO_2CF_3)_3$, $LiI$, $LiCl$, $LiF$, $LiPF_5(SO_2CF_3)$, or $LiPF_4(SO_2CF_3)_2$, or a combination thereof.

5. A rechargeable lithium battery, comprising
a positive electrode including a positive active material;
a negative electrode including a negative active material; and
the electrolyte according to claim 1.

6. The rechargeable lithium battery of claim 5, wherein the positive active material comprises a compound represented by one of Chemical Formulas 14 to 16:

$$Li_aMn_xCo_yNi_zO_2$$ [Chemical Formula 14]

wherein, $1.150 \leq a \leq 1.430$, $0.45 \leq x \leq 0.6$, $0.01 \leq y \leq 0.15$ and $0.10 \leq z \leq 0.39$, $$LiMn_xCo_yNi_zO_2$$ [Chemical Formula 15]

wherein, $0.3 \leq x \leq 0.85$, $0.10 \leq y \leq 0.3$ and $0.10 \leq z \leq 0.3$, $$LiMn_{1.5}Ni_{0.5}O_4.$$ [Chemical Formula 16]

7. The rechargeable lithium battery of claim 5, wherein the negative active material comprises a silicon-based material.

8. The rechargeable lithium battery of claim 5, wherein the bissulfonyl imide anion is represented by one of Chemical Formulas 2 to 8:

[Chemical Formula 2]

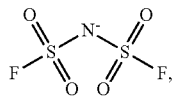

[Chemical Formula 3]

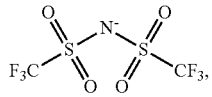

[Chemical Formula 4]

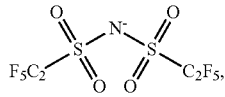

[Chemical Formula 5]

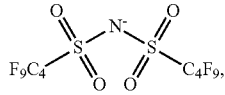

[Chemical Formula 6]

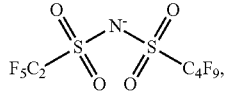

[Chemical Formula 7]

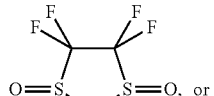

[Chemical Formula 8]

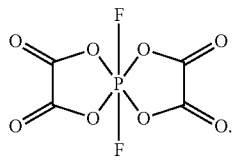

9. The rechargeable lithium battery of claim 5, wherein the complex anion is represented by Chemical Formula 10:

[Chemical Formula 10]

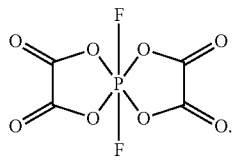

* * * * *